United States Patent [19]

O'Neil et al.

[11] Patent Number: 4,648,727
[45] Date of Patent: Mar. 10, 1987

[54] ANTIFRICTION BEARING ASSEMBLY FOR A DIE SET OR THE LIKE

[75] Inventors: Junior O'Neil, Somerset; Leonard D. Plagens, Broadview Heights, both of Ohio

[73] Assignee: Lempco Industries, Inc., Cleveland, Ohio

[21] Appl. No.: 717,226

[22] PCT Filed: Aug. 13, 1984

[86] PCT No.: PCT/US84/01271
§ 371 Date: Mar. 25, 1985
§ 102(e) Date: Mar. 25, 1985

Related U.S. Application Data

[63] Continuation-in-part of Ser. No. 552,830, Nov. 17, 1983, abandoned.

[51] Int. Cl.$^4$ .............................................. F16C 29/04
[52] U.S. Cl. ...................................... 384/49; 384/507; 384/906
[58] Field of Search .............. 308/4 C, 4 R, 6 R, 6 C, 308/6 B; 384/906, 507, 49

[56] References Cited

U.S. PATENT DOCUMENTS

| 2,422,774 | 6/1947 | Conner | 164/118 |
| 2,624,644 | 1/1953 | Bryant . | |
| 2,774,430 | 12/1956 | Blazek | 164/118 |
| 2,846,278 | 8/1958 | Blazek | 308/6 |
| 2,987,348 | 6/1961 | Blazek | 308/6 |
| 3,092,425 | 6/1963 | Conner | 308/6 B |
| 3,155,006 | 11/1964 | Schroeder . | |
| 3,514,166 | 5/1970 | Coley | 308/6 B |
| 3,752,540 | 8/1973 | Bosworth | 308/4 C |
| 4,312,546 | 1/1982 | Blaurock et al. | 308/6 C |

Primary Examiner—Lenard A. Footland
Attorney, Agent, or Firm—William S. Rambo; Wm. Cates Rambo

[57] ABSTRACT

An antifriction ball bearing assembly features a tubular, cylindrical ball retainer or cage which is carried for both reciprocating and rotational movement on an associated shaft or bushing member by means of a key or slide member which is slidable in an axial or longitudinal groove formed in the shaft or bushing and which projects radially into an annular groove formed in the bearing retainer.

4 Claims, 13 Drawing Figures

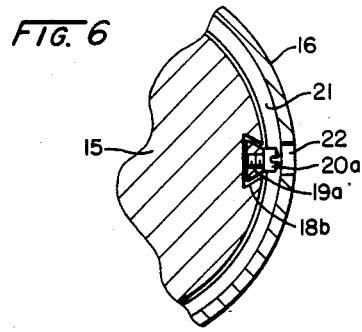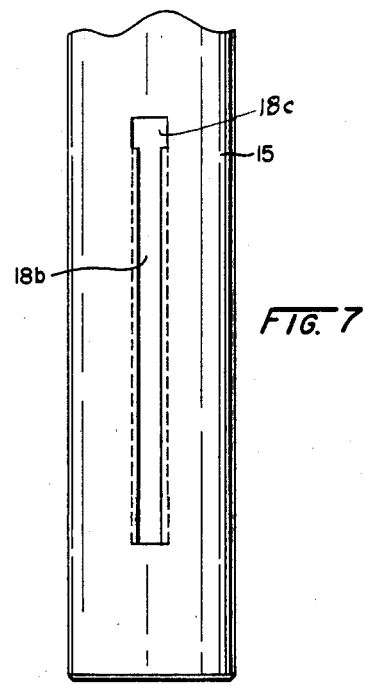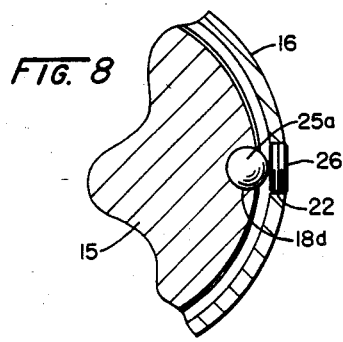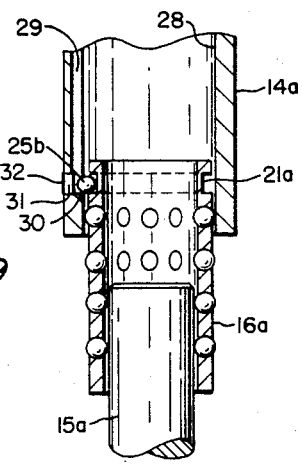

ANTIFRICTION BEARING ASSEMBLY FOR A DIE SET OR THE LIKE

RELATED APPLICATION

This application is a continuation-in-part of U.S. patent application Ser. No. 552,830 filed 17/11/83, abandoned.

TECHNICAL FIELD

This invention relates generally to ball bearing assemblies and more particularly to an improved ball bearing assembly for use in a die set, or other applications involving relatively reciprocable bushing and shaft members separated by an array of pressure-loaded ball bearings.

BACKGROUND ART

For many years, die sets of the type used in machine presses to mount and guide mating die parts for movement toward and from one another during reciprocation of the press have included a ball bearing retainer or cage arranged for telescoping reciprocation between relatively reciprocating shaft and bushing members. The balls carried by the retainer are slightly larger in diameter than the annular space between the shaft and bushing members, so that the balls are under a forced fit, or are compressed slightly, between the shaft and bushing members to thereby insure exact alignment of the die parts carried in the die set. See, for example, U.S. Pat. No. 2,422,774 issued June 24, 1947 to Conner.

While the so-called compression loaded ball bearing die sets were capable of excellent performance over an extended period of time, they were, nevertheless, subject to wear due to the tendency of the balls to track or form lines of wear on the relatively engaged surfaces of the shafts and bushings. Several attempts have been made to distribute the wear caused by the pressure engagement of the ball bearings with the opposing surfaces of the shafts and bushings. For example, the ball bearings were mounted in helical array within their retainer or cage, or in a pattern, so that no two balls followed the same track along the shaft and bushing during relative reciprocation thereof. Also, attempts were made to provide an assembly in which the ball bearing retainer was free to rotate as well as reciprocate on the shaft member upon removal of the shaft and retainer from the bushing. For example, U.S. Pat. Nos. 2,774,430 and 2,846,278 to William J. Blazek and No. 3,357,755 to Danly disclose reciprocating ball bearing assemblies for use in die sets, wherein the ball bearing retainers are free to rotate as well as to reciprocate with respect to the associated shaft and bushing components when the shaft is removed from the bushing. However, the constructions proposed by each of these prior art patents were comparatively complicated and greatly increased costs of production of the bearing assemblies.

DISCLOSURE OF THE INVENTION

The present invention provides an improved ball bearing assembly for use between two relatively telescoping, reciprocable members, such as a guide post and bushing of a die set, in which provision is made for axial rotational adjustment of the ball bearing retainer element relative to the associated guide post and bushing when the balls of the assembly are not under compressive loading. According to this invention, a ball bearing retainer is carried in properly indexed relation to a pair of relatively spaced apart, telescoping shaft and bushing members by means of a key member which extends into a longitudinal guideway or groove formed in the shaft or bushing and into a circumferential slot or groove formed in the ball bearing retainer, thereby permitting the retainer to be rotatively adjusted and to reciprocate with respect to the shaft and the bushing to this distribute normal wear over larger areas of the shaft and bushing.

The primary object of this invention is to provide a ball bearing assembly in which the ball retainer is movably keyed to a shaft or bushing in a manner permitting the ball retainer to be rotationally adjusted as well as being properly indexed when it is initially telescoped between the shaft and bushing members.

Another object is to provide a bearing assembly having the foregoing qualities which is economical to manufacture.

Further objects and advantages of this invention will become more readily apparent from the following description and the accompanying drawings.

BRIEF DESCRIPTION OF THE DRAWINGS

FIG. 6 is an enlarged, fragmentary horizontal sectional view taken through a second modified form of bearing assembly;

FIG. 7 is a fragmentary side elevational view of the shaft or guide post of FIG. 6 and showing the undercut guideway formed therein;

FIG. 8 is an enlarged, fragmentary, horizontal sectional view taken through yet another modified form of bearing assembly;

FIG. 9 is a medial vertical sectional view of a further modified form of bearing assembly according to this invention;

BEST MODE FOR CARRYING OUT THE INVENTION

Figure 1:
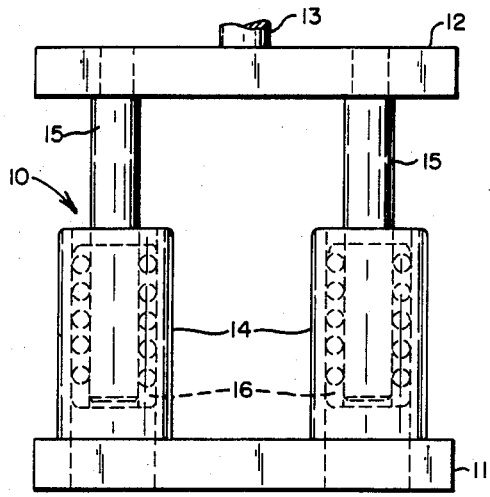
FIG. 1 is a side elevational view of a die set embodying ball bearing assemblies according to this invention.

With reference to FIG. 1 of the drawings, a punch press die set 10 is illustrated, and comprises the usual lower plate or shoe 11, an upper plate or shoe 12 and a shank 13 connected with and arising from the upper surface of the upper shoe 12. As will be understood by those familiar with metal-forming presses, the lower shoe 12 is usually rigidly connected with the stationary bed of a press, not shown, while the upper shoe 12 is connected by means of the shank 13 to the movable platen or ram of the press. Thus, during operation of the press, the upper shoe 12 reciprocates or moves up and down with respect to the lower shoe 12. Also, the upper and lower shoes of the die set normally have mounted on their relatively opposing surfaces, relatively interfitting male and female die components, not shown, between which a sheet or billet of metal may be positioned for stamping, drawing, or other forming operations.

Figure 2:
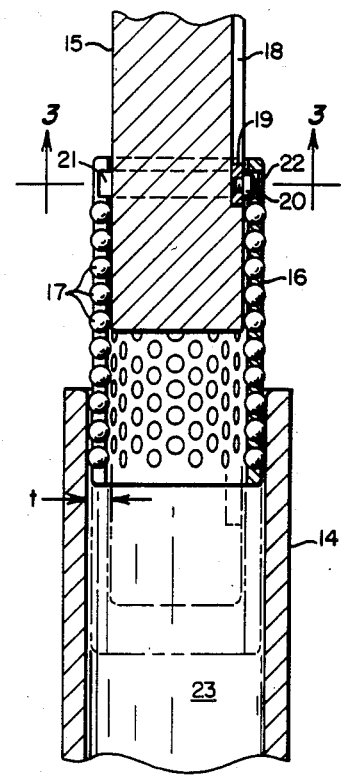
FIG. 2 is an enlarged, medial vertical sectional view taken through a ball bearing assembly according to this invention.
Figure 3:
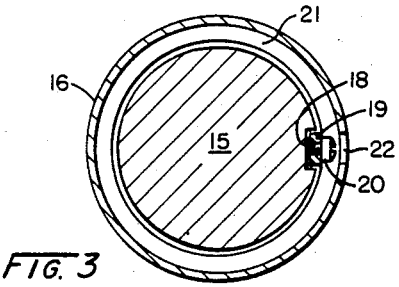
FIG. 3 is an enlarged horizontal cross-sectional view taken along the line 3—3 of FIG. 2.

The shoes 11 and 12 and the die members supported thereon are maintained in exacting vertical alignment by a pair of pre-loaded ball bearing assemblies 10, each of which includes a tubular cylindrical bushing 14 secured to the lower shoe 11, a cylindrical pin, post, or shaft 15 secured to the upper shoe 12 and arranged to telescope within the bushing 14, and a ball bearing retainer or cage 16 which is arranged to telescope between the shaft 15 and bushing 14. Each of the retainers 16 rollingly supports therein an array of spherical ball bearings 17 whose diameters exceed slightly (e.g. 0.0005 in.) the radial space (t) provided between the outer surface (O.D.) of the shaft 15 and the inner surface (I.D.) of the bushing 14 (FIG. 2). Thus, when the shafts 15 and retainers 16 telescope within the bushings 14, the ball bearing 17 are slightly compressed and are force or interference fitted between the adjacent surfaces of the shafts and bushings. The interference fit of the ball bearings causes them to roll over the outer surfaces of the shafts 15 and the inner surfaces of the bushings 14 during reciprocating movement of the shafts 15, and thus, the shafts and bushings are maintained in exact axial alignment. Also, the retainers or cages 16 will move in the same direction as the shafts 15, but only one-half the linear distance of movement of the shafts when the ball bearings 17 are under a forced fit between the shafts and bushings.

Thus, it is necessary that the retainers 16 be properly indexed or positioned with respect to the shafts 15 and bushings 14 when the ball bearings 17 are first placed under compression loading, otherwise the retainers or cages 16 might be driven into undesired and destructive engagement with either the bed or bolster of the press, or with the upper shoe 12 of the die set upon relative reciprocation of the shoes 11 and 12 by operation of the associated press.

Toward this end, each of the shafts or guide pins 15 of the die set are milled or otherwise formed with a slot or guideway 18 which extends axially, or longitudinally, throughout the intermediate or mid region of the shaft or pin, and which opens along the outer circumferential surface of the pin. A slide or runner block 19 having an outwardly projecting screw or bolt head 20 is slidably positioned in the guideway 18 and the bearing retainer or cage 16 is formed toward the upper end of its inner surface (I.D.) with an annular circumferential groove or track 21 into which the bolt head 20 projects. An opening 22 is formed in the outer wall of the retainer 16 and communicates with the groove 21 to provide screw driver access to the bolt head 20 is and when it is desired to remove the bolt head 20 from the slide or block 19. Thus, the slide or block 19 and the outwardly projecting bolt head 20 provide a key means connecting the retainer 16 to the shaft 15 while allowing the retainer to rotate freely around the shaft and to reciprocate longitudinally of the shaft within limits provided by the length of the slot or guideway 18. The lower end of the slot or guideway 18 is so located with respect to the lower end of the shaft 15 to insure that the retainer or cage will be properly indexed and positioned upon the initial telescoping of the lower end of the shaft 15 into the upper end of the bushing 14 and upon the compression loading of the first set of ball bearings 17 between the adjacent surfaces of the shaft and bushing. In other words, the bearing retainer 16 is indexed on the shaft 15, so that it will travel into the bushing 14 a distance equal to one-half the full stroke of the shaft within the bushing.

With reference to FIG. 2, it will be seen that when the guide pin or shaft 15 is withdrawn from the bushing 14, the bearing retainer or cage 16 is suspended from the lower end of the shaft by engagement of the slide block 19 with the lower end of the guideway 18. As the shaft 15 and retainer 16 move downwardly into the bore 23 of the bushing 14, the ball bearings 17 will become compressed between the outer surface of the shaft and the inner wall of the bushing and will then rollingly support the shaft 15 for free reciprocating movement within the bushing, but without any lateral play. Once the ball bearings 17 are compressed between the shaft and bushing, the retainer 16 will move only at one-half the linear velocity of the shaft 15. This differential causes the shaft 15 to reciprocate within the retainer 16 as well as within the bushing 14. However, the slide block 19 and its projecting bolt head 20 permit the shaft to reciprocate within the retainer and at the same time permit the retainer to rotate relative to the shaft 15 when the shaft is removed from the bushing and the balls 17 are relieved of compressive forces.

Figure 5:
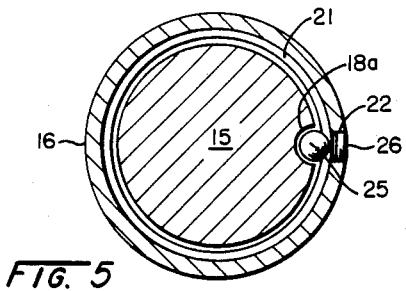
FIG. 5 is a horizontal sectional view taken along the section line 5—5 of FIG. 4.
Figure 4:
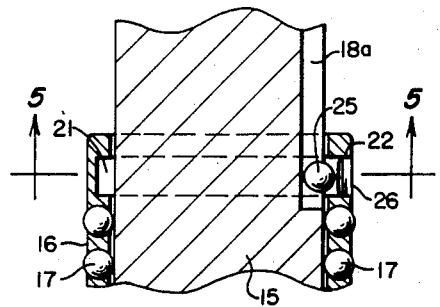
FIG. 4 is an enlarged, fragmentary vertical sectional view taken through a modified form of ball bearing assembly embodying the invention.

FIGS. 4 and 5 illustrate a modified form of key means for connecting the bearing retainer 16 for relative rotation and axial reciprocating movement on the shaft 15. In this modification, a single, spherical ball 25 replaces the slide block 19 and its bolt head 20. The diameter of the ball 25 exceeds the depth of a half-round guideway or slot 18a formed in the shaft 15, so that a segment of the ball 25 projects into the annular groove or track 21 of the retainer 16 to thereby bridge the gap between the shaft and the retainer. The ball 25 is retained against accidental removal from the guideway 18 and groove 21 by a removable plug 26 screw threaded into the opening 22 of the retainer 16. However, if and when it is desired to separate the retainer 16 from the shaft 15, such as for cleaning or replacement, this is easily accomplished simply by removing the screw-threaded plug 26 and then causing the ball to exit the retainer by way of the access opening 22.

FIGS. 6 and 7 show another modified form of key means for connecting the bearing retainer 16 to the guide pin or shaft 15 for relative axial rotation and reciprocating movement. In this modification, a wedge-shaped slide block 19a having tapered sides is slidably mounted in an undercut, dove-tailed guideway or slot 18b milled in the outer surface of the pin or shaft 15. A bolt head 20a projects radially outwardly from the slide block 19a and into the annular groove or track 21 of the retainer 16. The access opening 22 is provided in the retainer to permit removal of the bolt head 20a when it is desired to separate the bearing retainer 16 from the shaft 15. The guideway slot 18b is formed at its upper end with a relatively wider, not undercut, entrance opening 18c which permits the wedge-shaped slide block 19a to be admitted to and removed from the guideway 18b.

FIG. 8 illustrates yet another modified embodiment which is similar to the embodiment of FIG. 5, but in which a key ball 25a is slidably retained in an undercut guideway or slot 18d of frusto-circular cross-sectional configuration.

FIG. 9 illustrates a modified bearing assembly in which a bearing retainer 16a is indexed from and supported by a reciprocating tubular bushing 14a and is arranged to telescope over a relatively stationary guide post or shaft 15a. In this modified bearing assembly, the inner wall 28 of the bushing 14a is formed with a longitudinally directed guideway or groove 29 which opens into the bore of the bushing, but which terminates in a stop shoulder 30 located a distance above the lower end of the bushing. The bearing retainer 16a is formed toward its upper end with an annular, circumferential groove or track 21a, and a keying ball 25b extends between the track 21a and the guideway 29 to connect the retainer 16a to the bushing 14a for relative reciprocating and rotational movement. An access opening 31 is formed radially in the wall of the bushing and communicates with the lower end of the guideway 29. A plug 32 is screw threaded into the opening 31 to normally close it, but may be removed to permit removal of the keying ball 25b through the opening 31 when it is desired to separate the retainer 16a from the bushing 14a.

Figure 10:
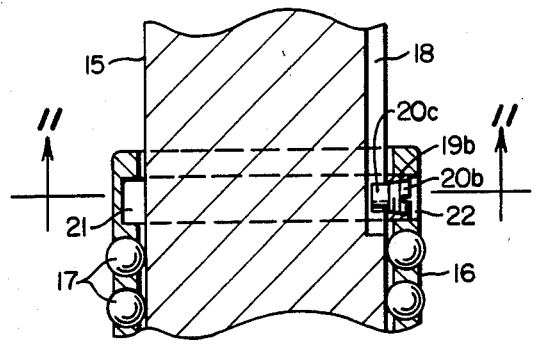
FIG. 10 is an enlarged, fragmentary, vertical sectional view taken through still another modified form of bearing assembly.
Figure 11:
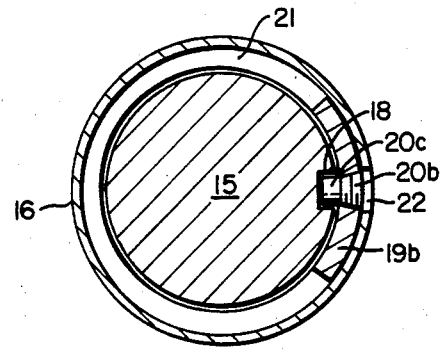
FIG. 11 is a horizontal sectional view taken along the line 11—11 of FIG. 10.

FIGS. 10 and 11 illustrate yet another modified form of key means for connecting the ball retainer 16 in properly indexed relation to the guide pin or shaft 15. In this instance, the key means takes the form of an arcuately curved block 19b which is slidably carried in the inner circumferential groove or track 21 formed in the retainer 16. The block 19b is provided with a flush head screw 20b having a cylindrical shank portion 20c projecting radially into the longitudinal groove or keyway 18 formed in the shaft 15. An opening 22 is formed in the outer wall of the retainer 16 and communicates with the track 21 to provide screw driver access to the screw member 20b. In operation, the arcuately curved block 19b and its flush head screw 20b are freely slidable within the track 21 of the retainer 16 to permit the latter to be rotationally adjusted on the shaft 15. At the same time, the cylindrical shank portion 20c of the screw projects loosely into the keyway 18 of the shaft 15 to permit the retainer to reciprocate axially on the shaft 15 within the limits imposed by the end walls of the keyway 18.

Figure 12:
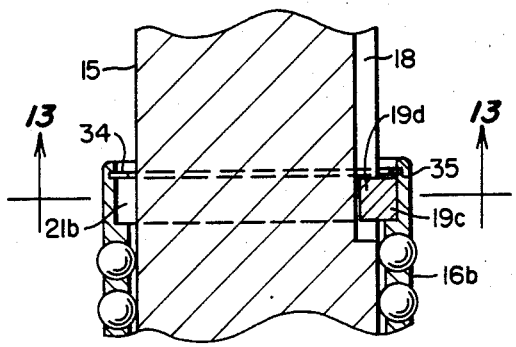
FIG. 12 is a fragmentary vertical section taken through another modified form of bearing assembly.
Figure 13:
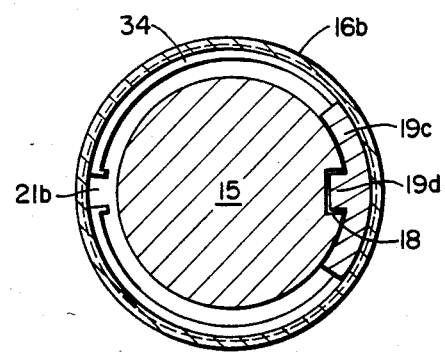
FIG. 13 is a horizontal section along the line 13—13 of FIG. 12.

FIGS. 12 and 13 show another form of key means for rotatively and reciprocatively connecting the ball retainer 16b to the guide pin or shaft 15. In this modification, the key means consists of an integral, one-piece, arcuately curved block or slide 19c which is slidable in the inner circumferential groove or track 21b formed in the upper end of the retainer 16b. The slide 19c also includes a central key portion 19d which projects radially inwardly of the keyway 18 formed in the shaft 15. A snap ring 34 is removably carried in a shallow groove 35 formed in the inner circumferential wall of the retainer and normally provides a stop to retain the key block 19c in the track 21b of the retainer. However, when it is desired to separate the retainer from the shaft 15, the snap ring 32 may be removed from its groove 35 to release the retainer 16b and the key block 19c from the shaft 15.

In view of the foregoing, it will be seen that the present invention provides an improved means for indexing and connecting a tubular bearing retainer to an associated guide post or bushing member while providing for reciprocation and rotational adjustment of the retainer with respect thereto.

We claim:

1. In a ball bearing assembly which includes relatively reciprocable and telescoping shaft and bushing members and a tubular, cylindrical ball bearing retainer arranged to telescope between said members; that improvement which comprises:
   (a) an annular, circumferential groove formed in said bearing retainer and opening toward one of said shaft and bushing members;
   (b) an axially directed guideway formed in said last-named member adjacent said bearing retainer and terminating a distance inwardly from an end of said last-named member; and
   (c) key means slidable within the circumferential groove of said retainer and extending into the guideway of said last-named member and connecting said bearing retainer to said last-named member for relative axial reciprocation and rotation, said key means comprising a slide movable within said guideway and having thereon a projection which extends radially into and is slidable within the circumferential groove formed in said retainer.

2. In a ball bearing assembly which includes relatively reciprocable and telescoping shaft and bushing members and a tubular, cylindrical ball bearing retainer arranged to telescope between said members; that improvement which comprises;
   (a) an annular, circumferential groove formed in said bearing retainer and opening toward one of said shaft and bushing members;
   (b) an axially directed guideway formed in said last-named member adjacent said bearing retainer and terminating a distance inwardly from an end of said last-named member; and
   (c) key means slidable within the circumferential groove of said retainer and extending into the guideway of said last-named member and connecting said bearing retainer to said last-named member for relative axial reciprocation and rotation; said retainer being formed with an access opening communicating with said circumferential groove and through which said key means may be removed from said circumferential groove.

3. In a ball bearing assembly which includes relatively reciprocable and telescoping shaft and bushing members and a tubular, cylindrical ball bearing retainer arranged to telescope between said members; that improvement which comprises:
   (a) an annular, circumferential groove formed in said bearing retainer and opening toward one of said shaft and bushing members;
   (b) an axially directed guideway formed in said last-named member adjacent said bearing retainer and terminating a distance inwardly from an end of said last-named member; and
   (c) key means slidable within the circumferential groove of said retainer and extending into the guideway of said last-named member and connecting said bearing retainer to said last-named member for relative axial reciprocation and rotation; said guideway comprising an undercut groove formed in an outer surface of said shaft member, and said key means is slidable longitudinally within said undercut groove.

4. A ball bearing assembly for telescoping interposition between a pair of relatively axially reciprocable members, one of which members is provided with an elongated, axially extending keyway terminating short of one end thereof, said assembly comprising a tubular, cylindrical ball retainer formed with a circumferential groove opening toward one of said members; and key means extending between and slidable in the keyway of said one of said members and in the circumferential groove of said retainer and connecting said retainer to said one of said members for relative axial rotation and reciprocation; and wherein the circumferential groove of said retainer is defined in part by a readily removable, resiliently contractible ring.

* * * * *